(12) United States Patent
Honda et al.

(10) Patent No.: US 11,031,837 B2
(45) Date of Patent: Jun. 8, 2021

(54) VEHICLE MOTOR UNIT

(71) Applicant: TOYOTA JIDOSHA KABUSHIKI KAISHA, Toyota (JP)

(72) Inventors: Tatsuki Honda, Toyota (JP); Yukinobu Nishikawa, Anjo (JP); Kazuki Iwakura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 16/182,769

(22) Filed: Nov. 7, 2018

(65) Prior Publication Data

US 2019/0140511 A1    May 9, 2019

(30) Foreign Application Priority Data

Nov. 9, 2017    (JP) .............................. JP2017-216828

(51) Int. Cl.
| | |
|---|---|
| *H02K 1/12* | (2006.01) |
| *H02K 5/04* | (2006.01) |
| *B60K 1/00* | (2006.01) |
| *F16H 57/02* | (2012.01) |
| *H02K 1/18* | (2006.01) |
| *B60K 17/00* | (2006.01) |
| *H02K 5/06* | (2006.01) |
| *H02K 7/00* | (2006.01) |

(52) U.S. Cl.
CPC .................. *H02K 5/04* (2013.01); *B60K 1/00* (2013.01); *B60K 17/00* (2013.01); *F16H 57/02* (2013.01); *H02K 1/185* (2013.01); *H02K 5/06* (2013.01); *H02K 7/006* (2013.01); *B60Y 2200/92* (2013.01); *B60Y 2306/01* (2013.01); *B60Y 2410/115* (2013.01); *F16H 2057/02043* (2013.01)

(58) Field of Classification Search
CPC ....................................................... H02K 5/04
See application file for complete search history.

(56) References Cited

U.S. PATENT DOCUMENTS

| | | | | |
|---|---|---|---|---|
| 6,359,355 | B1 * | 3/2002 | Hartsfield | .............. H02K 1/148 |
| | | | | 310/254.1 |
| 10,367,397 | B2 * | 7/2019 | Onishi | ..................... H02K 15/14 |
| 10,576,815 | B2 * | 3/2020 | Nagao | ....................... H02K 5/04 |
| 2003/0107279 | A1 * | 6/2003 | Yang | ........................ H02K 5/04 |
| | | | | 310/89 |
| 2013/0302152 | A1 * | 11/2013 | Choji | ...................... H02K 5/04 |
| | | | | 415/191 |

(Continued)

FOREIGN PATENT DOCUMENTS

| | | |
|---|---|---|
| JP | 2009-247087 A | 10/2009 |
| JP | 2012-146856 A | 8/2012 |
| WO | 2012/073959 A1 | 6/2012 |

*Primary Examiner* — Alexander Talpalatski
(74) *Attorney, Agent, or Firm* — Oliff PLC

(57) ABSTRACT

In a vehicle motor unit comprising: a motor; and a storage housing storing the motor, the motor including a rotor arranged rotatably around a rotation axis, a stator disposed on an outer circumferential side of the rotor, and a high voltage portion disposed on the stator, an outer circumferential surface of the stator is configured to surface contact with a part of a wall surface of the storage housing receiving a larger collision load at the time of a vehicle collision as compared to the other parts.

1 Claim, 4 Drawing Sheets

(56) References Cited

U.S. PATENT DOCUMENTS

| | | | | |
|---|---|---|---|---|
| 2014/0167559 A1* | 6/2014 | Eike | ................. | H02K 15/00 |
| | | | | 310/216.131 |
| 2014/0312726 A1* | 10/2014 | Wu | ................. | H02K 7/1166 |
| | | | | 310/83 |
| 2018/0072342 A1* | 3/2018 | Brochot | ................. | B23P 11/00 |

* cited by examiner

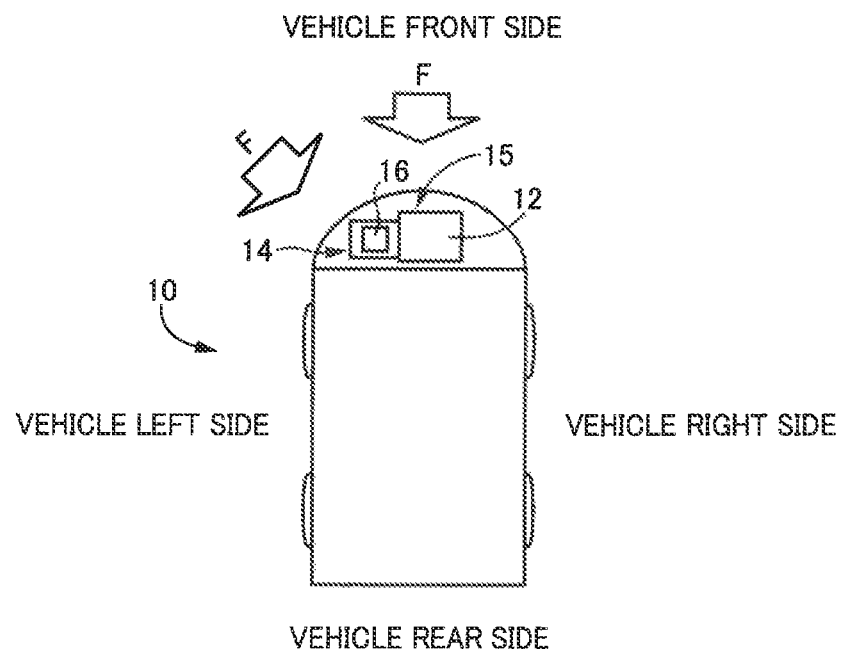
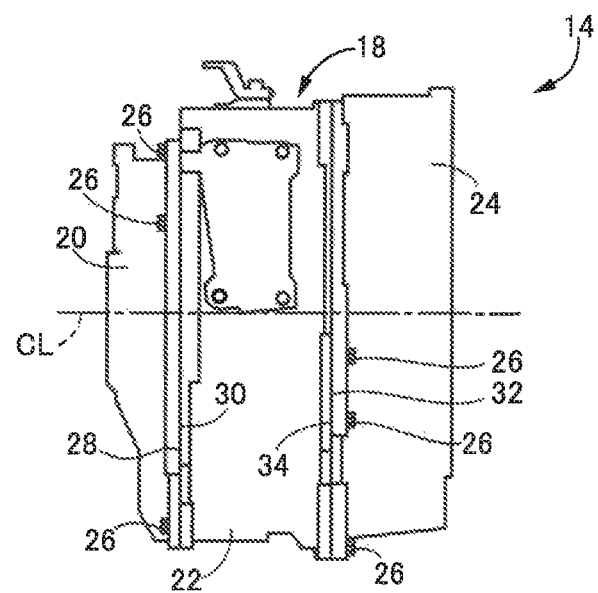

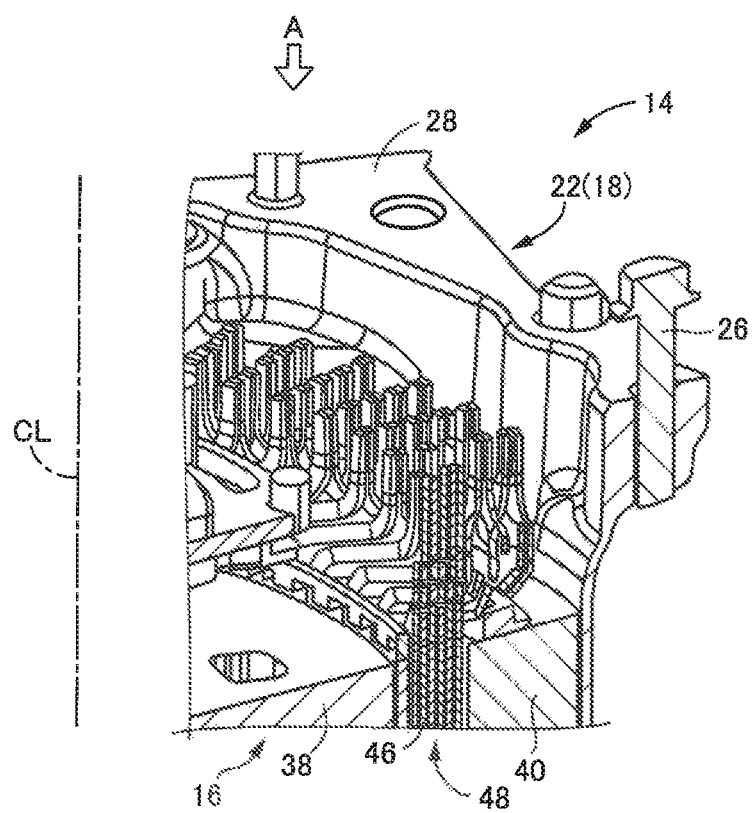

VEHICLE MOTOR UNIT

BACKGROUND OF THE INVENTION

Field of the Invention

The present invention relates to a structure of a vehicle motor unit having a motor housed in a casing.

Description of the Related Art

Patent Document 1 discloses a storage housing in an internal space of which a high voltage portion is stored, wherein the internal space is formed by a surrounding wall, and the wall has a larger thickness set by being formed into a rib shape at a part to which impact is expected to be subjected, as compared to the other parts of the wall. By increasing the thickness of the expected impact part of the wall, the rigidity of the part subject to impact in the wall is intensively increased.

CITATION LIST

Patent Document 1: Japanese Laid-Open Patent Publication No. 2012-146856
Patent Document 2: WO2012/073959

SUMMARY OF THE INVENTION

Technical Problem

In a vehicle motor unit in which a motor housed in a storage housing includes a rotor, a stator disposed on the outer circumferential side of the rotor, and a high voltage portion, if the storage housing is increased in thickness of a wall to be subject to impact as in Patent Document 1 so as to prevent a damage of the storage housing, the thickness of the wall must be increased to such an extent that the wall is not damaged due to the impact, which causes problems such as an increase in vehicle weight and an increase in cost by contraries.

The present invention was conceived in view of the situations and it is therefore an object of the present invention to provide a vehicle motor unit having a motor housed in a storage housing and capable of preventing a damage of the storage housing without significantly increasing the wall thickness of the storage housing.

Solution to Problem

To achieve the above object, a first aspect of the present invention provides a vehicle motor unit comprising: (a) a motor; and a storage housing storing the motor, the motor including a rotor arranged rotatably around a rotation axis, a stator disposed on an outer circumferential side of the rotor, and a high voltage portion disposed on the stator, wherein (a) an outer circumferential surface of the stator is configured to surface contact with a part of a wall surface of the storage housing receiving a larger collision load at the time of a vehicle collision as compared to the other parts.

A second aspect of the present invention provides the motor unit recited in the first aspect of the invention, wherein a fastening portion of the storage housing is disposed at a position close to a part of the storage housing brought into surface contact with the outer circumferential surface of the stator.

A third aspect of the present invention provides the motor unit recited in the first or second aspect of the invention, wherein the part of the storage housing brought into surface contact with the outer circumferential surface of the stator has a wall thickness made larger than the other parts of the storage housing.

Advantageous Effects of Invention

According to the vehicle motor unit recited in the first aspect of the invention, when the vehicle collides, the part of the wall surface of the storage housing which receives a larger collision load at the time of a vehicle collision as compared to the other parts in the wall of the storage housing is in surface contact with the outer circumferential surface of the stator, and therefore, the stator bears the collision load, so that the damage of the storage housing is prevented. Thus, the damage of the storage housing can be prevented without significantly increasing the thickness of the wall of the storage housing or adding a rib etc.

According to the vehicle motor unit recited in the second aspect of the invention, the fastening portion of the storage housing is disposed at a position close to the part of the storage housing to be brought into surface contact with the outer circumferential surface of the stator, and therefore, even if the collision load is applied to the periphery of the fastening portion, the collision load is borne by the stator, so that the damage of the fastening portion is also prevented. Thus, the fastening function is prevented from being lost due to the damage of the fastening portion.

According to the vehicle motor unit recited in the third aspect of the invention, the part of the storage housing to be brought into surface contact with the outer circumferential surface of the stator has the wall thickness larger than the other parts of the storage housing and therefore can be brought into surface contact with the outer circumferential surface of the stator. The thickness of the wall of the part of storage housing to be brought into surface contact with the outer circumferential surface of the stator only needs to have a dimension allowing surface contact with the outer circumferential surface of the stator, and therefore, it is not necessary to increase the wall thickness to the extent that the damage due to the collision load can be prevented by only the storage housing, so that the weight increase of the storage housing is minimized. When the fastening portion is disposed close to the part of the storage housing to be brought into surface contact with the outer circumferential surface of the stator, the fastening portion can be shifted to the inner side of the storage housing by an amount corresponding to the increase in thickness of the storage housing. Therefore, the load applied to the fastening portion can be distributed.

BRIEF DESCRIPTION OF DRAWINGS

FIG. 1 is a simplified top view of a vehicle according to an example of the present invention.

FIG. 2 is an external view of an HV transmission shown in FIG. 1.

FIG. 3 is a perspective view showing an internal structure with a portion inside the HV transmission shown in FIG. 1 cut away.

DESCRIPTION OF THE PREFERRED EMBODIMENTS

Figure 4:
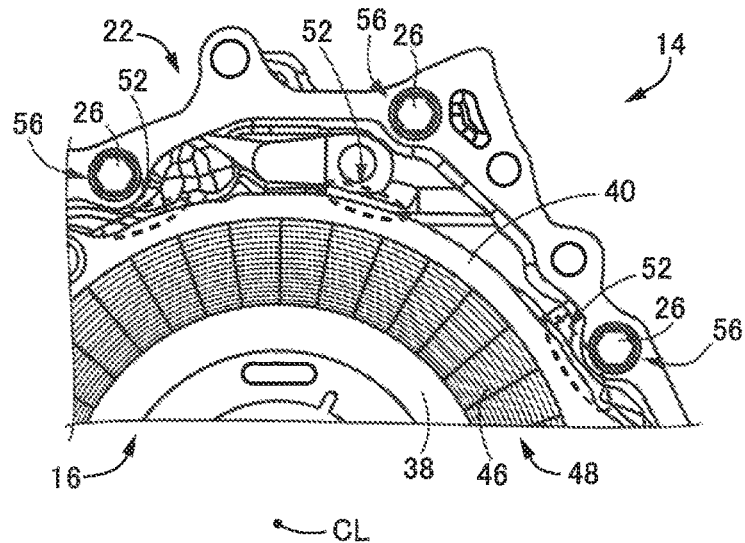
FIG. 4 is a portion of a view of the inside of a casing of FIG. 3 as seen in the direction of an arrow A of FIG. 3.

In this embodiment, a storage housing is made of aluminum, and a stator constituting a motor is made of a metal material having a rigidity higher than the storage housing.

An example of the present invention will now be described in detail with reference to the drawings. In the following example, the figures are simplified or deformed as appropriate and portions are not necessarily precisely drawn in terms of dimension ratio, shape, etc.

EXAMPLE

FIG. 1 is a simplified top view of a vehicle 10 according to an example of the present invention. The upper side, the lower side, the left side, and the right side on the plane of FIG. 1 correspond to the vehicle front side, the vehicle rear side, the vehicle left side, and the vehicle right side, respectively. The vehicle 10 is a hybrid vehicle using as a drive power source at least one of an engine 12 and a motor 16 housed in a transmission 14 for a hybrid vehicle (HV transmission 14). The vehicle 10 includes a driving device 15 of an FF (front-engine front-wheel drive) type in which the engine 12 and the HV transmission 14 are arranged on the vehicle front side. The HV transmission 14 corresponds to a vehicle motor unit of the present invention.

FIG. 2 is an external view of the HV transmission 14. The HV transmission 14 includes a motor 16 (see FIGS. 3 and 4) and a gear mechanism (not shown) in a casing unit 18. The casing unit 18 is made up of three casing components, which are a rear cover 20, a casing 22, and a housing 24, and these casing components are fastened to each other by bolts 26 to constitute the single casing unit 18. The rear cover 20, the casing 22, and the housing 24 are all made of aluminum. The casing 22 corresponds to a storage housing of the present invention.

The rear cover 20 is formed into a disk shape and closes one side of the casing unit 18. The casing 22 is formed into a cylindrical shape with both ends opened. The rear cover 20 and the casing 22 are fastened by the multiple bolts 26 such that a mating surface 28 formed at one opened end of the casing 22 is brought into close contact with a mating surface 30 formed on the rear cover 20. The casing 22 and the housing 24 are fastened by the multiple bolts 26 such that a mating surface 32 formed at the other opened end of the casing 22 is brought into close contact with a mating surface 34 formed on the housing 24. The mating surfaces of the casing components are fastened in close contact with each other in this way so that oil stored in the casing unit 18 is prevented from leaking.

FIG. 3 is a perspective view showing an internal structure with a portion inside the HV transmission 14, specifically, by cutting away a portion of the casing 22. The up-down direction on the plane of FIG. 3 corresponds to the left-right direction on the plane of FIG. 2, so that the mating surface 28 of the casing 22 is located on the upper side on the plane of FIG. 3. The casing unit 18 of the HV transmission 14 houses therein the gear mechanism (not shown) for transmitting drive power, an oil pump (not shown) for pumping oil for lubricating the gear mechanism and cooling the motor 16, the motor 16 shown in FIG. 3, etc. A predetermined amount of oil is stored in the casing unit 18, and the oil pumped up by the oil pump is supplied to a lubricating circuit (not shown) and thereby supplied to the gear mechanism and the motor 16. The oil stored in the casing unit 18 is supplied to the gear mechanism and the motor 16 also due to being agitated by the gear mechanism, for example.

The motor 16 is arranged in the casing unit 18 rotatably around a rotation axis CL (hereinafter referred to as an axis CL) shown in FIG. 3, The motor 16 comprises a rotor 38 arranged rotatably around the axis CL, a stator 40 arranged on the outer circumferential side of the rotor 38, and a high voltage portion 48 provided with the stator 40.

The rotor 38 is formed into an annular shape and is supported by a bearing (not shown) rotatably around the axis CL. The stator 40 is formed into an annular shape and is disposed on the outer circumferential side of the rotor 38. The stator 40 is non-rotatably fixed to the casing 22 by bolts (not shown). The stator 40 is formed by laminating multiple disk-shaped steel plates and has a strength higher than the casing 22, The stator 40 has notches formed at multiple locations in a circumferential direction and each of the notches radially extends from an inner circumferential surface of the stator 40 outward in a radial direction, and multiple power lines 46 are arranged to pass through the notches parallel to the axis CL. The multiple power lines 46 constitute the high voltage portion 48 through which high voltage electricity flows during running of the vehicle 10.

Figure 5:
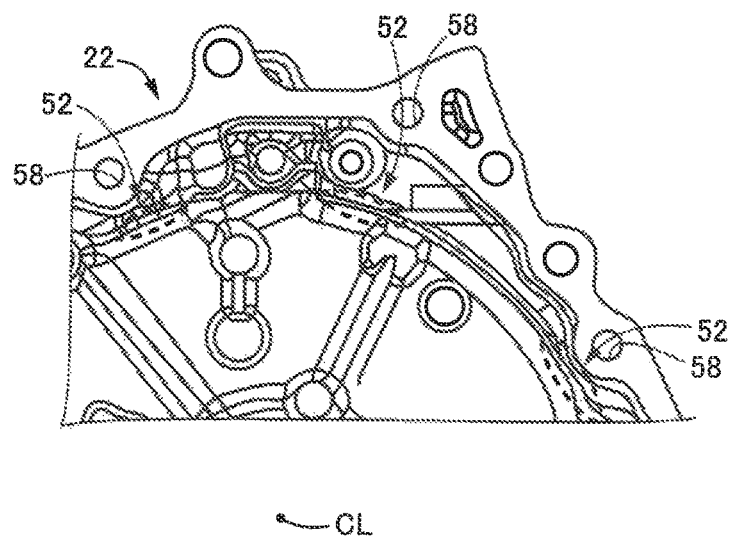
FIG. 5 is a view of the inside of the casing of FIG. 3 as seen in the direction of the arrow A, particularly showing a state in which a motor is removed.
Figure 6:
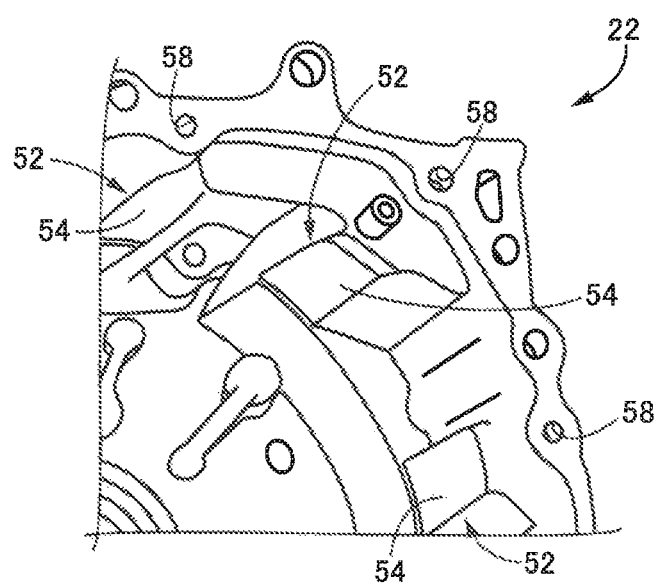
FIG. 6 is a perspective view of the casing shown in FIG. 5.

FIG. 4 is a portion of a view of the inside of the casing 22 of FIG. 3 as seen in the direction of an arrow A of FIG. 3 (a view seen from one side of the axis CL). FIG. 5 is a view of the inside of the casing 22 of FIG. 3 as seen in the direction of the arrow A, particularly showing a state in which the motor 16 is removed. FIG. 6 is a perspective view of the casing 22 shown in FIG. 5.

As shown in FIG. 4, the motor 16 is accommodated in the casing 22. At parts surrounded by broken lines of FIG. 4, a wall surface of the casing 22 and an outer circumferential surface of the stator 40 are in surface contact with each other. The wall surface of the casing 22 and the outer circumferential surface of the stator 40 are in surface contact with each other at multiple locations in the circumferential direction of the stator 40. In FIG. 4, three locations are shown as the parts of the surface contact surrounded by the broken lines between the wall surface of the casing 22 and the outer circumferential surface of the stator 40; however, the parts of the surface contact between the wall surface of the casing 22 and the outer circumferential surface of the stator 40 are actually formed at the other parts in the circumferential direction of the stator 40 not shown in FIG. 4.

As shown in FIGS. 5 and 6, the casing 22 has casing contact portions 52 formed to be in surface contact with the outer circumferential surface of the stator 40 when the motor 16 is assembled in the casing 22. Each of the casing contact portions 52 is provided with a contact surface 54 (see FIG. 6) formed into an arc shape along the outer circumferential surface of the stator 40. The casing contact portion 52 in the casing 22 has the wall thickness larger than the other parts of the wall of the casing 22 so that the contact surface 54 can come into contact with the outer circumferential surface of the stator 40. As described above, since only the casing contact portion 52 has the wall thickness larger than the other parts of the casing 22, which is necessary to allow the contact surface 54 to contact with the outer circumferential surface of the stator 40, the weight increase of the casing 22 due to the increase in the wall thickness is minimized.

The casing 22 and the rear cover 20 are fastened by the bolt 26 in a bolt fastening portion 56 disposed at a position close to the casing contact portion 52, i.e., at a position close to the part of the casing 22 in surface contact with the outer circumferential surface of the stator 40. Specifically, the bolt fastening portion 56 is located outside the casing contact portion 52 in the radial direction around the axis CL. The bolt fastening portion 56 corresponds to a fastening portion of the present invention.

Since the contact surface 54 of the casing contact portion 52 is located on the inner side of the casing 22 to allow the casing 22 to surface contact with the outer circumferential surface of the stator 40, the wall thickness of the casing contact portion 52 is increased as compared to the wall of the casing 22 other than the casing contact portion 52. Therefore, the bolt fastening portion 56 can be shifted to the inner side of the casing 22 by an amount due to the increase in the wall thickness of the casing contact portion 52. When the bolt fastening portion 56 is shifted to the inner side of the casing 22, a position of a bolt hole 58 allowing insertion of the bolt 26 shown in FIGS. 5 and 6 is formed on the inner side of the easing 22 as compared to a position of a conventional bolt hole. Since the bolt fastening portion 56 is disposed on the inner side of the casing 22 as compared to the conventional casings, fastening load applied to each bolt 26 is distributed.

The casing contact portion 52 of the casing 22 is formed at a part where a collision load F received by the casing 22 is larger than the other parts of the casing 22 at the time of a vehicle collision. The part having a larger collision load F received by the casing 22 at the time of a vehicle collision is specified in advance by a collision test and an analysis test. For example, by performing the collision test of the casing 22, a part of the casing 22 damaged due to the collision load F is specified. This damaged part corresponds to the part having the large collision load F. The collision test is performed in multiple patterns such as frontal, oblique, and lateral collisions of the vehicle, and the part having the large collision load F is specified from the test results of all these patterns of the collision test. The casing contact portion 52 corresponds to "a part of a wall surface of the storage housing receiving a larger collision load at the time of a vehicle collision as compared to the other parts" of the present invention and corresponds to "a part of the storage housing brought into surface contact with the outer circumferential surface of the stator" of the present invention.

Additionally the part having the large collision load F in the casing 22 at the time of a vehicle collision is also specified by the analysis test. For example, it is analytically confirmed which part(s) of the casing 22 comes into contact with circumferential components at the time of a vehicle collision, and a stress distribution is analytically calculated when a forced displacement is input to this part(s). The result of this analysis is used for specifying a part where the stress concentrates at the time of a vehicle collision. This part corresponds to the part having the large collision load F. Even in the analysis test, calculations are made on the assumption of various patterns of collisions such as frontal, oblique, lateral collisions of the vehicle. By performing at least one of the collision test and the analysis test, the part having the large collision load F in the casing 22 is specified, and the casing contact portion 52 is formed at this part.

Description will hereinafter be made of the effect of forming the casing contact portion 52 in the casing 22 in surface contact with the outer circumferential surface of the stator 40. When the vehicle 10 collides, the casing 22 receives the collision load F. In this case, the collision load F received by the casing contact portion 52 of the casing 22 is larger as compared to the other parts of the casing 22. On the other hand, since the contact surface 54 of the casing contact portion 52 is in surface contact with the outer circumferential surface of the stator 40, the collision load F is transmitted through the casing contact portion 52 to the stator 40. Therefore, the stator 40 bears the collision load F received by the casing 22. Additionally, since the stator 40 has higher rigidity than the casing 22, a damage of the casing 22 is prevented by allowing the stator 40 to bear the collision load F received by the casing 22. This also prevents from an electric shock to a person's hand when the hand touches the high voltage portion 48 in the casing 22.

By forming the casing contact portion 52, the wall thickness increases in the casing contact portion 52; however, the wall thickness only needs to reach a position allowing the contact surface 54 to contact with the outer circumferential surface of the stator 40, so that the weight increase of the casing 22 due to the increase in the wall thickness is minimized. This leads to a reduction in manufacturing cost and an improvement in fuel efficiency of the vehicle 10. Furthermore, since the thickness of the casing 22 does not significantly increase, a degree of freedom in mounting inside the casing 22 is also improved.

Since the bolt fastening portion 56 is disposed at a position close to the casing contact portion 52, the collision load F transmitted to the bolt fastening portion 56 is borne by the stator 40, so that the damage of the bolt fastening portion 56 is also prevented. Therefore, the fastening function between the casing 22 and the rear cover 20 is prevented from being lost due to the damage of the bolt fastening portion 56, and the oil stored in the casing unit 18 is prevented from leaking due to the loss of the fastening function.

The bolt fastening portion 56 disposed close to the casing contact portion 52 can be shifted to the inner side of the casing 22 by an amount corresponding to the increase in the wall thickness of the casing contact portion 52. When the bolt fastening portion 56 is disposed on the inner side the casing 22, the fastening force of each of the bolts 26 can be equalized. Since the fastening force of each of the bolts 26 is equalized, even if the number of the bolts 26 is reduced, the fastening force can be ensured between the easing 22 and the rear cover 20. As a result, the manufacturing cost can be reduced.

As described above, according to this example, when the vehicle 10 collides, the contact surface 54 of the casing contact portion 52 receives a larger collision load as compared to the other parts in the wall of the casing 22 at the time of a vehicle collision and is in surface contact with the outer circumferential surface of the stator 40, and therefore, the stator 40 bears the collision load F, so that the damage of the casing 22 is prevented. Thus, the damage of the casing 22 can be prevented without significantly increasing the thickness of the wall of the casing 22 or adding a rib etc.

According to this example, the bolt fastening portion 56 of the casing 22 is disposed in the casing 22 at a position close to the casing contact portion 52 brought into surface contact with the outer circumferential surface of the stator 40, and therefore, even if the collision load F is applied to the periphery of the bolt fastening portion 56 of the casing 22, the collision load F is borne by the stator 40, so that the damage of the bolt fastening portion 56 of the casing 22 is also prevented. Thus, the fastening function is prevented from being lost due to the damage of the bolt fastening portion 56.

According to this example, the casing contact portion 52 of the casing 22 in surface contact with the outer circumferential surface of the stator 40 has the wall thickness larger than the other parts of the casing 22 and therefore can be brought into surface contact with the outer circumferential surface of the stator 40. The thickness of the wall of the casing contact portion 52 in surface contact in the casing 22 only needs to have a dimension allowing surface contact with the outer circumferential surface of the stator 40, and therefore, it is not necessary to increase the wall thickness to the extent that the damage due to the collision load F can be prevented by only the casing 22, so that the weight increase of the casing 22 is minimized. When the bolt fastening portion 56 of the casing 22 is disposed close to the casing contact portion 52, the bolt fastening portion 56 can be shifted to the inner side of the casing 22 by an amount corresponding to the increase in thickness of the casing 22. Therefore, the load applied to the bolt fastening portion 56 can be distributed.

Although the example of the present invention has been described in detail with reference to the drawings, the present invention is also applied in other forms.

For example, in the example described above, the casing contact portion 52 is formed on the casing 22; however, if the stator 40 is disposed on the side of the rear cover 20 or the housing 24, the casing contact portion 52 may be formed on the rear cover 20 or the housing 24.

In the example described above, the casing unit 18 is made up of the three casing components, which are the rear cover 20, the casing 22, and the housing 24; however, the present invention is not necessarily limited thereto. For example, the casing unit 18 may be made up of two casing components or four or more casing components. In short, the present invention is appropriately applicable to any casing unit which houses the motor 16.

The above description is merely an embodiment and the present invention can be implemented in variously modified and improved forms based on the knowledge of those skilled in the art.

REFERENCE SIGNS LIST

10: Vehicle
14: HV transmission (Vehicle motor unit)
16: Motor
22: Casing (Storage housing)
38: Rotor
40: Stator
48: High voltage portion
52: Casing contact portion (A part of a wall surface the storage housing receiving a larger collision load at the time of a vehicle collision as compared to the other parts of the storage housing)
56: Bolt fastening portion (Fastening portion)

What is claimed is:

1. A vehicle motor unit comprising:
a motor that includes a rotor arranged rotatably around a rotation axis, a stator disposed on an outer circumferential side of the rotor, and a high voltage portion disposed on the stator; and
a casing unit storing the motor, wherein
the casing unit is made up of multiple casing components including a storage housing, the multiple casing components being fastened to each other and arranged sequentially in a direction of the rotation axis,
the storage housing has a contacting part that is formed on a wall surface of the storage housing facing an outer circumferential surface of the stator and that makes surface contact with the outer circumferential surface of the stator at multiple locations in a circumferential direction of the stator, the multiple locations being spaced apart from each other in the circumferential direction of the stator so as to alternate in the circumferential direction of the stator with other parts of the storage housing that do not make surface contact with the outer circumferential surface of the stator,
a fastening portion of the storage housing that interconnects the storage housing to an other one of the multiple casing components is disposed at a position adjacent to the contacting part of the storage housing that is formed on the wall surface of the storage housing facing the outer circumferential surface of the stator and that makes surface contact with the outer circumferential surface of the stator,
the contacting part of the storage housing that is formed on the wall surface of the storage housing facing the outer circumferential surface of the stator and that makes surface contact with the outer circumferential surface of the stator receives a larger collision load at a time of a vehicle collision as compared to the other parts of the storage housing, and
the contacting part of the storage housing that is formed on the wall surface of the storage housing facing the outer circumferential surface of the stator and that makes surface contact with the outer circumferential surface of the stator has a wall thickness that is larger than a wall thickness of the other parts of the storage housing that are formed on the wall surface of the storage housing facing the outer circumferential surface of the stator and that do not make surface contact with the outer circumferential surface of the stator.

* * * * *